(12) United States Patent
Wang et al.

(10) Patent No.: US 7,077,664 B1
(45) Date of Patent: Jul. 18, 2006

(54) MODULE CONNECTOR

(75) Inventors: Chin Chou Wang, Tucheng (TW); Yi Chiu Kao, Tucheng (TW); Chung Hsin Huang, Tucheng (TW)

(73) Assignee: Cheng Uei Precision Industry Co., Ltd., Taipei (TW)

( * ) Notice: Subject to any disclaimer, the term of this patent is extended or adjusted under 35 U.S.C. 154(b) by 0 days.

(21) Appl. No.: 11/073,668

(22) Filed: Mar. 8, 2005

(51) Int. Cl.
*H01R 9/09* (2006.01)

(52) U.S. Cl. ........................................ 439/70; 439/607

(58) Field of Classification Search ................ 439/68, 439/70, 71, 607, 83; 250/239, 208, 215; 29/840, 740; 257/432; 358/474
See application file for complete search history.

(56) References Cited

U.S. PATENT DOCUMENTS 3,651,444 A * 3/1972 Desso et al. ................ 439/141
6,905,344 B1 * 6/2005 Nishio et al. ................ 439/68

* cited by examiner

*Primary Examiner*—Alexander Gilman
(74) *Attorney, Agent, or Firm*—Rosenberg, Klein & Lee

(57) ABSTRACT

A module connector includes an insulated component, a plurality of contacts inside the module connector and a housing shell outside of the module connector. The insulated component has four sidewalls that define an inserting space to receive another module. Each sidewall has a plurality of contacts parallel L-shaped slots to accommodate the contacts that are electrically connected with the outside module. The housing shell has four side containing walls. A pressing pin and an elastic pin are extended from the top of each side-containing wall towards the inserting space. The pressing pins prop downwardly the outside module.

9 Claims, 6 Drawing Sheets

MODULE CONNECTOR

BACKGROUND OF THE INVENTION

1. Field of the Invention

The present invention relates to a module connector, especially to a module connector to retain a digital camera lens module.

2. The Related Art

Nowadays, the digital camera technology is so widely applied that more and more consumption electronic products have integrated the photographing function thereon. It is familiar that a module connector is set on the main body of a consumption electronic product and an outside digital camera lens module is assembled in the connector of the module to integrate the photographing function.

The Japan patent application No. 2004-241225 published on Aug. 26, 2004 disclosed a module connector to retain the digital camera lens module as the above description. The module connector includes a rectangular insulated component. The four sidewalls of the rectangular insulated component form an inserting space to accommodate a digital camera module. Each sidewall has a plurality of contacts inside. Each contact extends a propping portion to engage the electrical slices set on the lens module in order to prevent the lens module to move horizontally relative to the module connector.

The module connector further includes four metal boards. The top of each board extends a retaining pin to engage the corresponding sidewall of the insulated component, and then the board is assembled with the insulated component. A pressing pin is extended downwardly from each metal board. The pressing pins press on the top of the lens module. The pressing pins are connected electrically with the ground touching slice on the top of the lens module. Accordingly, it would prevent the lens module from moving relative to the module connector.

The pins on the inside wall of the insulated component have limited room to move, so that the pins can not provide enough propping force to retain the lens module. In the result, the module connector cannot well connect with the lens module. If strengthening the pins to enhance the propping force, the pins would become ineffective due to lack of elasticity. Accordingly, it is difficult to retain the lens module in the module connector stably and reliably.

SUMMARY OF THE INVENTION

The object of the present invention is to provide a module connector comprising an insulated component, a plurality of contacts inside the module connector, and a housing shell outside of the module connector. The insulated component has four sidewalls that define an inserting space to receive another module. Each sidewall has a plurality of parallel L-shaped slots to accommodate the contacts that are electrically connected with the outside module. The housing shell has four side containing walls. A pressing pin and an elastic pin are extended from the top of each side-containing wall towards the inserting space. The pressing pins prop downwardly the outside module. The elastic pins press on the sidewalls of the outside module. The housing shell is configured to set on the outside of the insulated component, so that it is unnecessary to occupy the transverse width of the sidewalls. Comparing with the contacts in the pre-art, the elastic pins of the housing shell have enough room to move in order to provide enough force to prop the sidewalls of the lens module, so that the lens module is retained stably in the module connector.

Figure 1:
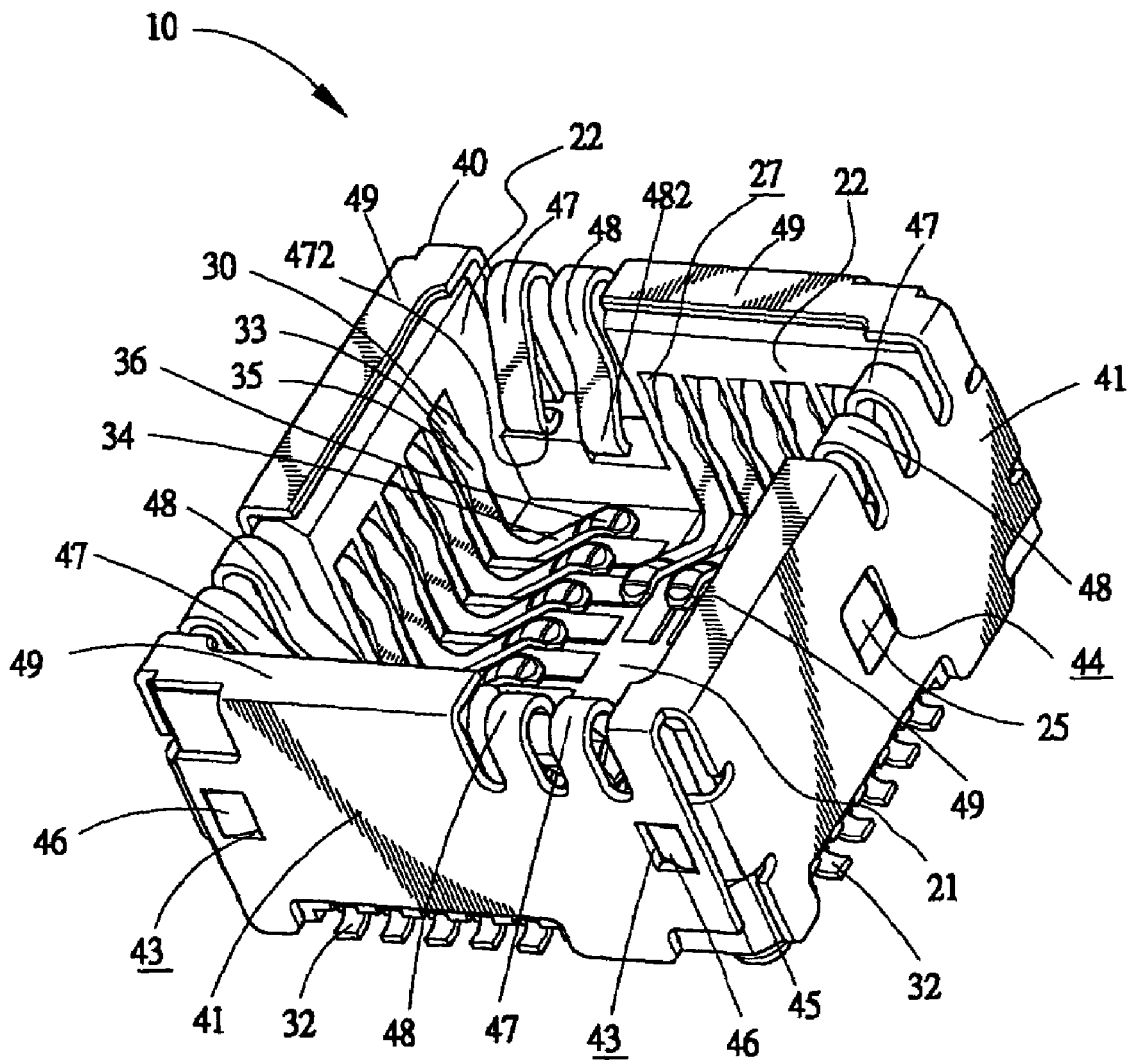
FIG. 1 is a perspective view of a module connector in accordance with a first embodiment of the present invention.

The foregoing summary, as well as the following detailed description of certain embodiments of the present invention, will be better understood when read in conjunction with the appended drawings. For the purpose of illustrating the invention, there is shown in the drawings, certain embodiments. It should be understood, however, that the present invention is not limited to the arrangement and instrumentalities shown in the attached drawings.

DETAILED DESCRIPTION OF THE PREFERRED EMBODIMENT

Figure 2:
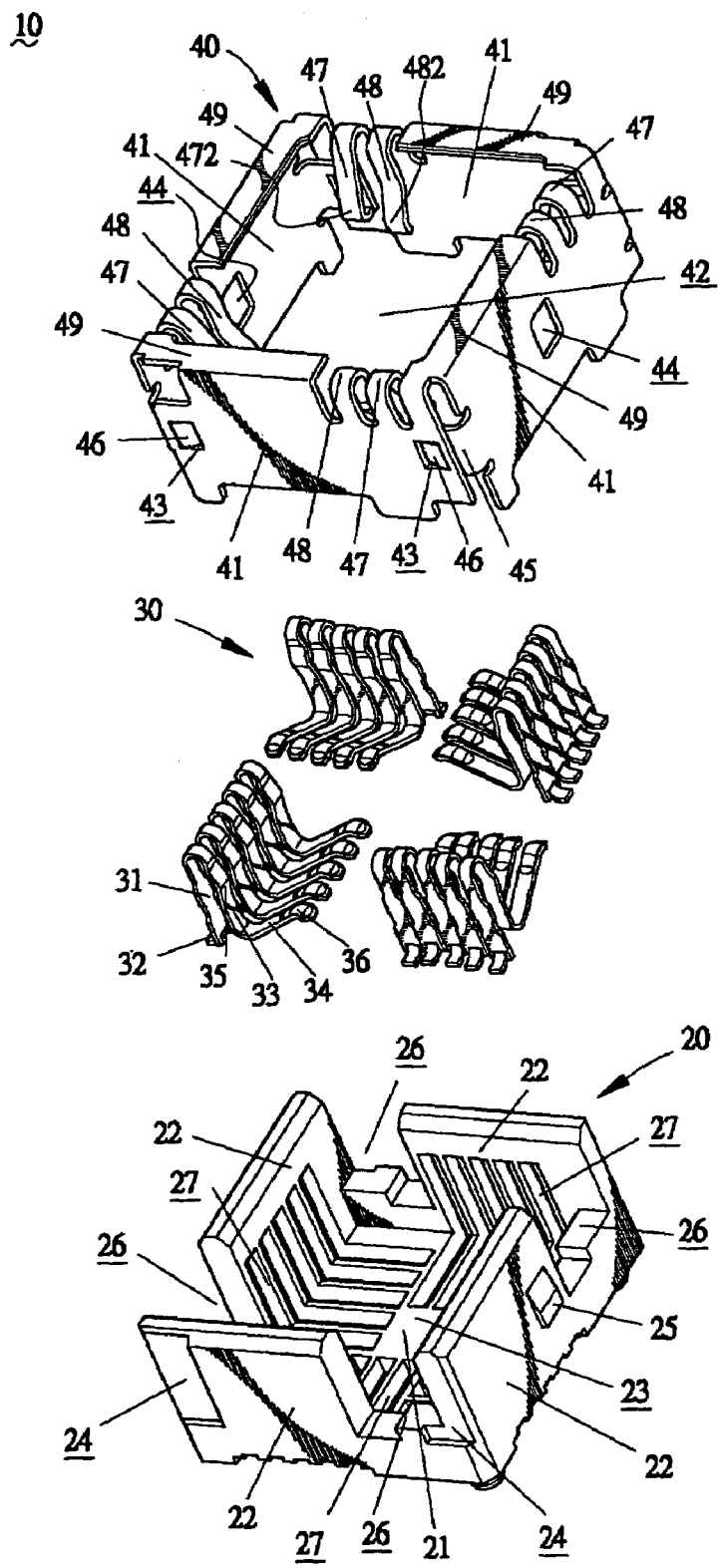
FIG. 2 is an exploded view of the module connector shown in FIG. 1.

FIGS. 1 and 2 illustrate a module connector 10 of the first embodiment of the present invention. The module connector 10 comprises an insulated component 20, a plurality of contacts 30 received in the insulated component 20 and a housing shell 40 covering the module connector 10.

The insulated component 20 includes a bottom board 21 extending four sidewalls 22 from the four sides of the bottom board 21. An inserting space 23 is formed between the four sidewalls 22. Four engagement recesses 24 are formed on the two sides of the front and back sidewalls 22. Two wedges 25 are attached on the middle part of the left and right sidewalls 22. Each sidewall 22 has a cutout 26 going through the corresponding sidewall 22. Each cutout 26 is closed at the bottom and opened at the top. A plurality of parallel slots 27 is extended along the bottom board 21 and the four sidewalls 22 to form L-shaped slots.

Each contact 30 has a base portion 31. A welding portion 32 is horizontally extended from the bottom of each base portion 31. A side supporting part 33 is flexed downwardly from the top of each base portion 31. Each side supporting part 33 extends an intermediate portion 34 upwardly. A propping portion 35 is formed towards the corresponding intermediate portion 34 on the nearly middle part of each side supporting part 33. A bottom portion 36 is extended from the top of each intermediate portion 34.

A housing shell 40 is made of metal material as a whole. The housing shell 40 has four side containing walls 41 engaged with each other. In assembly, only one action is needed to set the four side containing walls 41 on the insulated component 20, so that it is easy to assemble the module connector 10. The four side containing walls 41 define a room 42. The front and back side containing walls 41 have a plurality of apertures 43. A plurality of wedge apertures 44 is set in the middle part of the left and right side containing walls 41. A plurality of hands 45 are perpendicularly flexed from the left and right side containing walls 41 towards the room 42. Each hand 45 extends a detaining block 46 to engage the aperture 43, so that the two neighboring side-containing walls 41 are retained stably. A pressing pin 47 and an elastic pin 48 are flexed downwardly towards the room 42 at one end of each side containing walls 41. A top wall 49 is flexed horizontally towards the room 42 at the other end of each side containing walls 41. The elastic pins 48 are in the middle of the pressing pins 47 and the top walls 49. A propping portion 472 is flexed from the free end of a pressing pin 47 towards the room 42. A contacting portion 482 is flexed from the free end of an elastic pin 48 towards the room 42.

Figure 5:
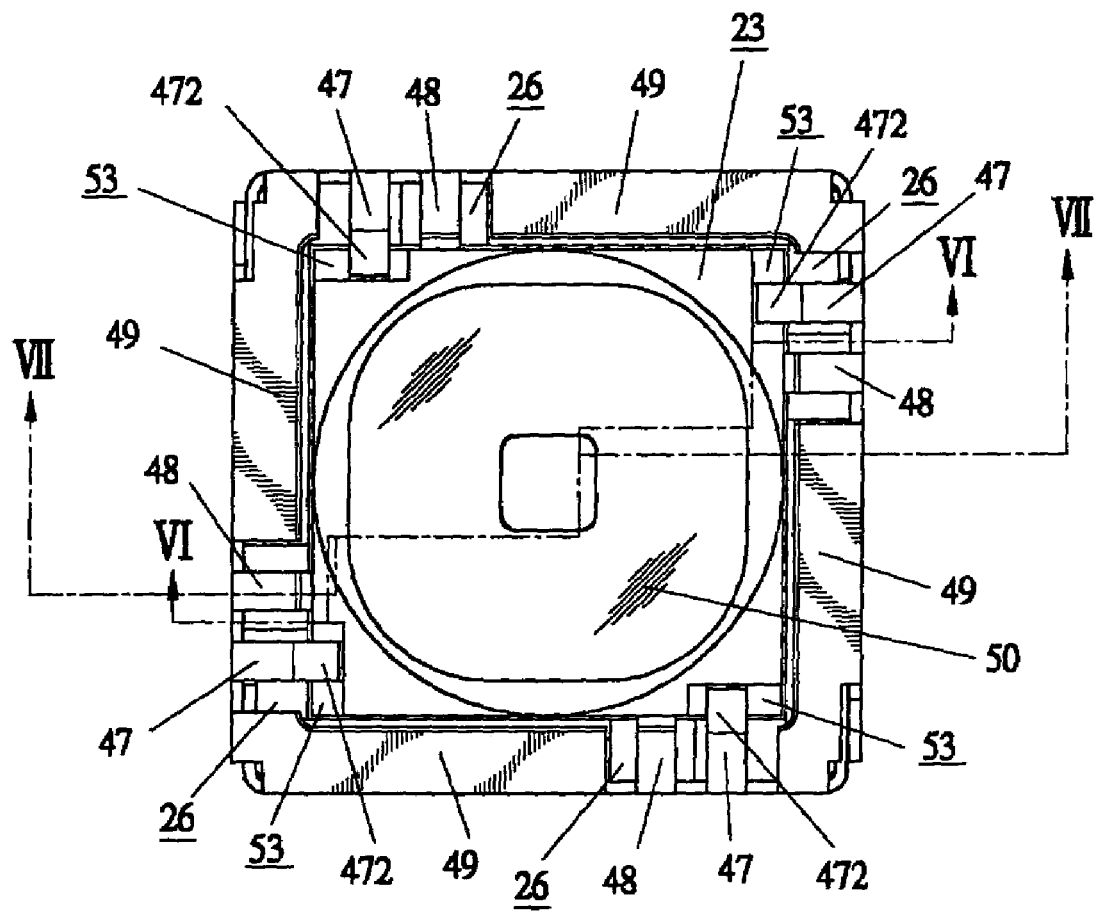
FIG. 5 is a top plan view showing the module connector and the lens module after assembly.
Figure 6:
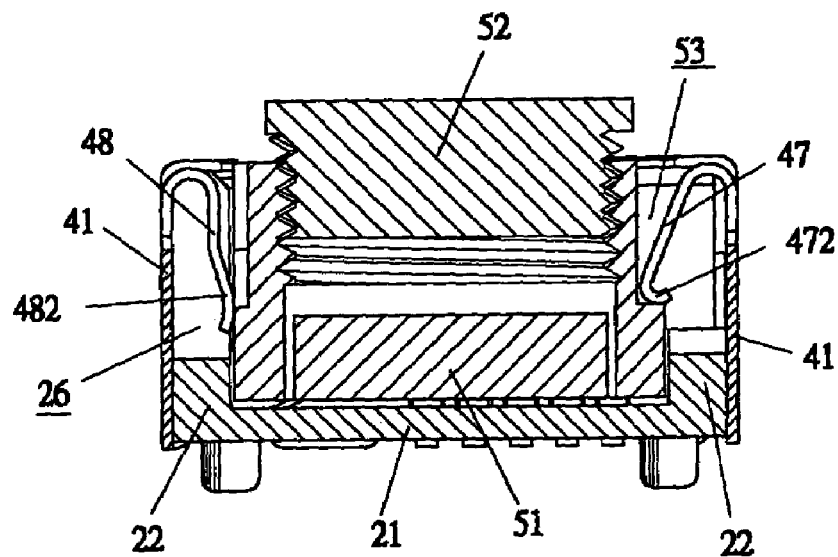
FIG. 6 is a cross-sectional view of FIG. 5 along the VI—VI line.
Figure 7:
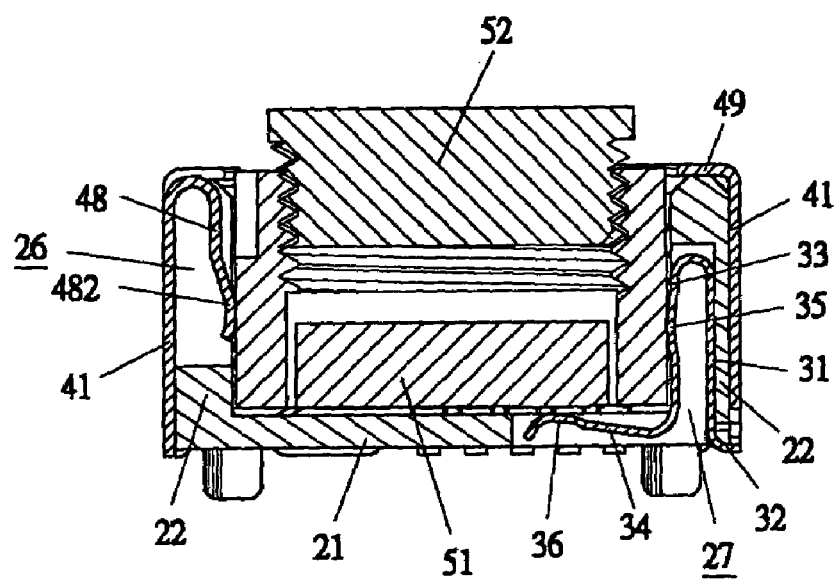
FIG. 7 is a cross-sectional view of FIG. 5 along the VII—VII line.

Please further refer to FIGS. 6 and 7. For the first embodiment of the module connector 10, in assembly, the base portions 31 of the contacts 30 are received in the parallel L-shaped slots 27 of the insulated component 20. The side supporting parts 33 and the intermediate portions 34 are received in the parallel L-shaped slots 27. The propping portion 35 of the side supporting parts 33 and the bottom portions 36 of the intermediate portions 34 are exposed from the parallel L-shaped slots 27 and embedded in the inserting space 23. The housing shell 40 engages downwardly the insulated component 20. The room 42 of the housing shell 40 overlaps the inserting space 23 of the insulated component 20 to accommodate a lens module 50 (shown in FIGS. 5 and 6). The wedges 25 of the insulated component 20 are inserted into the wedge apertures 44 of the housing shell 40 to forbidden the housing shell 40 to move up. The top wall 49 of the housing shell 40 covers the top planes of the sidewalls 22 to prevent the housing shell 40 to move downwardly. The hands 45 of the housing shell 40 extend to the engagement recesses 24 of the insulated component 20 to engage the housing shell 40 and the insulated component 20. The pressing pins 47 and the elastic pins 48 of the housing shell 40 are put into the inserting space 23.

Figure 4:
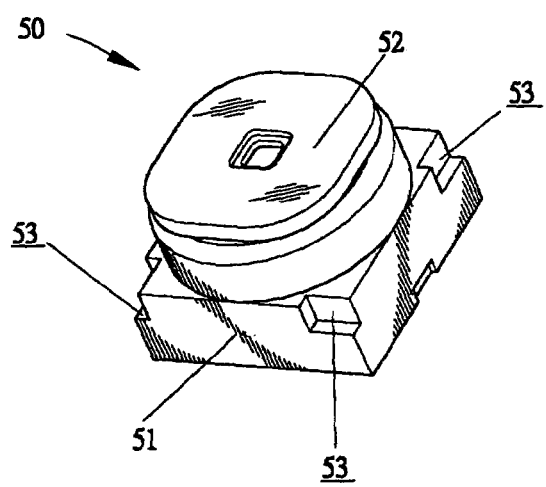
FIG. 4 is a digital camera lens module accommodated with the module connector shown in FIG. 1.

Further refer to FIG. 4. The lens module 50 includes a base 51, a lens base 52 installed on the top of the base 51, receiving recesses 53 formed at the four corners of the base 51 and a plurality of metal slices (not shown) set on the bottom of the base 51.

Please further refer to FIGS. 5,6 and 7. The lens module 50 is inserted into the inserting space 23. The base 51 is pressed and fitted into the inserting space 23. The propping portion 35 of the side supporting parts 33 and the contacting portion 482 of the elastic pins 48 firmly contact with the base 51 of the lens module 50. That is, the side supporting parts 33 and the elastic pins 48 prop the base 51 to retain the lens module 50 and prevent the lens module 50 from moving horizontally. The pressing pins 47 extend into the receiving recesses 53. The hook-shaped propping portions 472 prop the receiving recesses 53 to prevent the lens module 50 moving upwardly or downwardly. The bottom portions 36 of the contacts 30 press on the metal slices of the base 51 to transfer signals between the module connector 10 and the lens module 50.

As illustrated in FIGS. 6 and 7, the housing shell 40 is configured to set on the outside of the insulated component 20, so that it is unnecessary to occupy the transverse width of the sidewalls 22. Comparing with the contacts in the pre-art, the elastic pins 48 of the housing shell 40 have enough room to move in order to provide enough force to prop the side walls of the lens module 50, so that the lens module 50 is retained stably in the module connector 10. In the mean while, the propping portions 35 of the contacts 30 further press on the side of the lens module 50 to connect the module connector 10 more stably.

Figure 3:
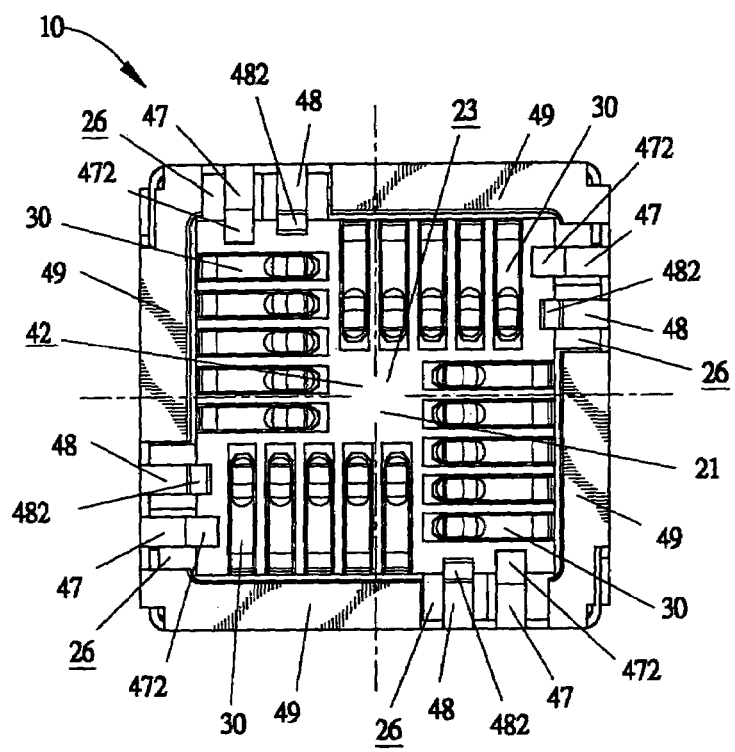
FIG. 3 is the top plan view of the module connector shown in FIG. 1.

Please refer to FIG. 3 in conjunction with FIG. 7. The dash dotted lines in FIG. 3 are the central lines of each side of the module connector 10. In FIG. 3, there are four contacts 30 set on one side of the central lines of each side of the module connector 10. A contact 30, a pressing pin 47 and an elastic pin 48 are located on the other side of the module connector 10. In FIG. 7, the housing shell 40 encloses on the outside of the insulated component 20, so that the elastic pins 48 have enough room to move horizontally. The contacts 30 are received in the sidewalls 22 of the insulated component 20, so that the propping portions 35 of the contacts 30 have minimal horizontal displacement. The pressing force from the elastic pins 48 is larger than the pressing force from the contacts 30. In the optimal condition, the moment of the one side of the central line is equal to the moment of the other side of the central line. The elastic pins 48 and the contacts 30 are set on each side of the module connector 10 with the same configuration, so that the lens module 50 is prevented from rotating and moving horizontally in the inserting space 23. Accordingly, the lens module 50 is located precisely and stably in the module connector 10.

Figure 8:
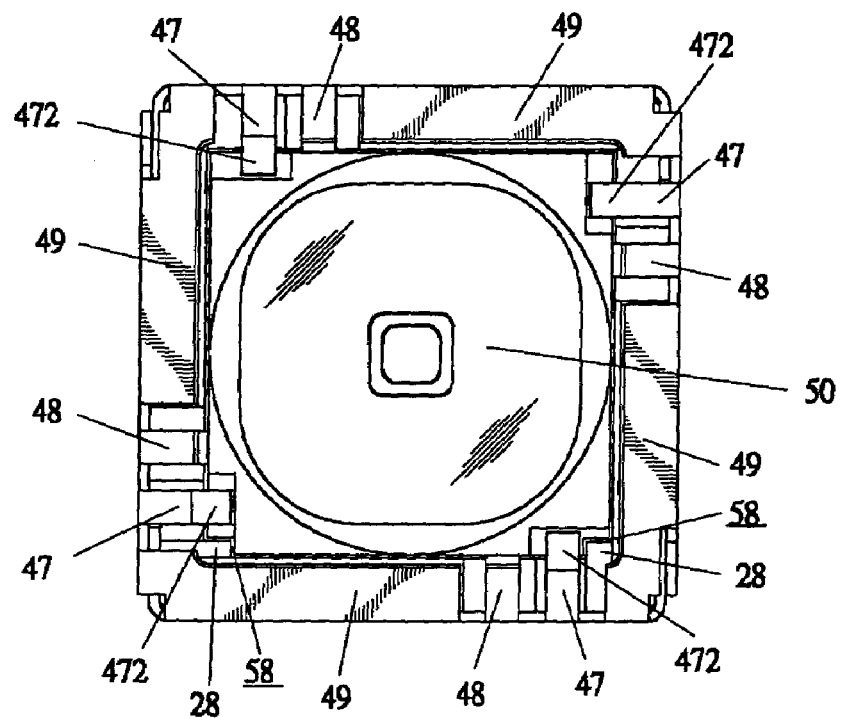
FIG. 8 is a top plan view of the module connector in accordance with a second embodiment of the present invention engaging with a digital camera lens module.
Figure 9:
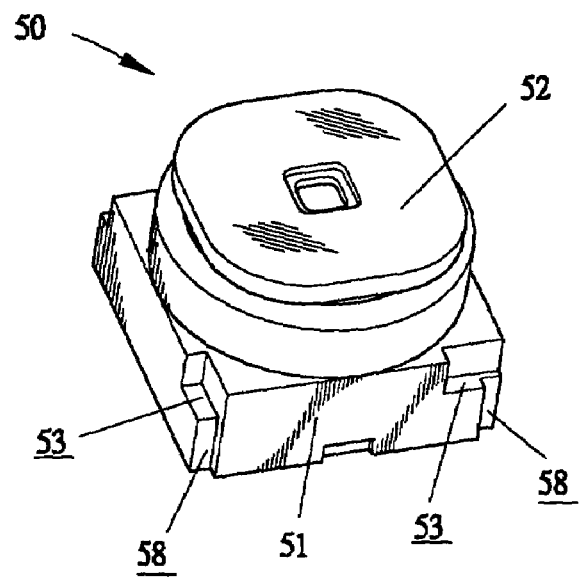
FIG. 9 is a perspective view of the lens module shown in FIG. 8.

Please further refer to FIGS. 8 and 9. In the present invention, the difference between the first embodiment and the second embodiment is that the second embodiment has an error-preventing component that includes a plurality of error-preventing blocks 28. The error-preventing blocks 28 are extended upright from two ends of the side of the bottom boards 21. A plurality of error-preventing recesses 58 is formed on the two sides of the sidewall of the base 51. The error-preventing recesses 58 are joined with the receiving recesses 53 on the top of the base 51. In assembly, only when the error-preventing recesses 58 correspond to the error-preventing blocks 28, the lens module 50 is properly inserted into the inserting space 23. Accordingly, the module connector 10 and the lens module 50 are assembled together precisely and stably due to the error-preventing component.

It is to be understood, however, that even through numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A module connector, comprising:
   an insulated component having four sidewalls that define an inserting space to receive an outside module, each sidewall having a plurality of slots;
   a plurality of contacts received in the corresponding slots and electrically connected with the outside module, each said contact having a propping portion and an intermediate portion extending transversely therefrom to terminate at a bottom portion, said propping and bottom portions being disposed to concurrently engage side and bottom surfaces of the outside module; and,
   a housing shell including four side containing walls, a pressing pin and an elastic pin being extended from the top of each side containing wall towards the inserting space, the pressing pins propping downwardly the outside module, the elastic pins pressing on the side walls of the outside module.

2. The module connector of claim 1, wherein each sidewall has a cutout going through the corresponding sidewall, each cutout is closed at the bottom and opened at the top.

3. The module connector of claim 1, wherein the insulated component further has error-preventing blocks engaging corresponding error-preventing recesses set on the outside module.

4. The module connector of claim 1, wherein the housing shell is integrally formed and includes four side containing walls.

5. The module connector of claim 1, wherein a propping portion is flexed from the free end of a pressing pin, a contacting portion is flexed from the free end of an elastic pin towards the inserting space.

6. The module connector of claim 1, wherein each pin has a propping portion exposed outside of the slots of the insulated component and extend into the inserting space to engage the outside wall of the outside module.

7. The module connector of claim 6, wherein the elastic pins are disposed in respectively defined quadrants of the housing shell, a plurality of contacts being set in each quadrant, the moment defined at one adjacent pair of quadrants being equal to the moment defined at the other adjacent pair of quadrants.

8. The module connector of claim 6, wherein the contacts each have upright base portions engaging the slots of the insulated component, and a side supporting part is flexed downwardly from the top of each base portion, the side supporting part being received in one of the slots, each intermediate portion extending upwardly from one of the side supporting parts, and the propping portion being formed intermediately on each side supporting part, each bottom portion being formed at the uppermost part of each intermediate portion.

9. The module connector of claim 8, wherein the insulated component further has a bottom board, the sidewalls extend from the bottom board, and the slots are formed in the bottom board and the sidewalls to be parallel L-shaped slots, the propping portion of the side supporting parts and the bottom portions of the intermediate portions are exposed from the parallel L-shaped slots and embedded in the inserting space.

* * * * *